United States Patent
Salowitz

(10) Patent No.: US 10,060,752 B2
(45) Date of Patent: Aug. 28, 2018

(54) DETECTING DEVIATION FROM PLANNED PUBLIC TRANSIT ROUTE

(71) Applicant: Microsoft Technology Licensing, LLC, Redmond, WA (US)

(72) Inventor: Elizabeth Salowitz, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/191,402

(22) Filed: Jun. 23, 2016

(65) Prior Publication Data
US 2017/0370735 A1 Dec. 28, 2017

(51) Int. Cl.
G01C 21/34 (2006.01)
G08G 1/123 (2006.01)

(52) U.S. Cl.
CPC ..... G01C 21/3415 (2013.01); G01C 21/3423 (2013.01); G01C 21/3446 (2013.01); G08G 1/123 (2013.01)

(58) Field of Classification Search
CPC .................. G01C 21/3415; G01C 21/3446
See application file for complete search history.

(56) References Cited

U.S. PATENT DOCUMENTS

| 5,559,707 | A | 9/1996 | DeLorme et al. |
| 7,496,444 | B1 | 2/2009 | Fried |
| 7,650,234 | B2 | 1/2010 | Obradovich et al. |
| 7,957,871 | B1 | 6/2011 | Echeruo |
| 8,108,501 | B2 | 1/2012 | Birnie et al. |
| 8,138,907 | B2 | 3/2012 | Barbeau et al. |
| 8,188,859 | B1 | 5/2012 | Emigh |
| 8,255,159 | B1 | 8/2012 | Bierbaum et al. |

(Continued)

FOREIGN PATENT DOCUMENTS

| CN | 104658297 A | | 5/2015 |
| EP | 2244064 A1 | | 10/2010 |
| KR | 20160112805 A | * | 9/2016 |

OTHER PUBLICATIONS

Potts, et al., "A Guide for Planning and Operating Flexible Public Transportation Services", In Technical Report 140 of Transit Cooperative Research Program, Jul. 23, 2015, 98 pages.

(Continued)

Primary Examiner — Rodney A Butler
(74) Attorney, Agent, or Firm — Alleman Hall Creasman & Tuttle LLP

(57) ABSTRACT

A mobile computing device is provided that includes a processor configured to determine a recommended route for a user of the mobile computing device to travel from a first location to a second location, the recommended route including at least a public transportation segment. The processor is further configured to detect position information for the user of the mobile computing device, detect an off-route condition during the public transportation segment based on the position information, the off-route condition indicating that the user has deviated from the recommended route during the public transportation segment by a predetermined threshold, and based on at least detecting the off-route condition during the public transportation segment, programmatically determine a new route to the second location.

16 Claims, 11 Drawing Sheets

(56) References Cited

U.S. PATENT DOCUMENTS

| | | | |
|---|---|---|---|
| 8,301,371 | B2 | 10/2012 | Sheha et al. |
| 8,400,294 | B2 | 3/2013 | Bishop et al. |
| 8,401,786 | B2 | 3/2013 | Poppen et al. |
| 8,433,341 | B2 | 4/2013 | Dredge |
| 8,467,957 | B2 | 6/2013 | Brandis |
| 8,645,050 | B2 | 2/2014 | Gontmakher et al. |
| 8,825,376 | B1* | 9/2014 | Szybalski .......... G01C 21/3415 701/412 |
| 8,868,343 | B1 | 10/2014 | Caine et al. |
| 8,972,177 | B2 | 3/2015 | Zheng et al. |
| 9,074,893 | B2 | 7/2015 | Kim et al. |
| 9,159,238 | B2 | 10/2015 | Manolescu |
| 9,177,472 | B2 | 11/2015 | Kim et al. |
| 9,204,251 | B1 | 12/2015 | Mendelson |
| 9,212,924 | B1 | 12/2015 | Salowitz |
| 2005/0021231 | A1 | 1/2005 | Matsuda et al. |
| 2006/0149466 | A1 | 7/2006 | Kikuchi et al. |
| 2006/0184314 | A1 | 8/2006 | Couckuyt et al. |
| 2006/0289624 | A1 | 12/2006 | Olmos et al. |
| 2007/0129055 | A1 | 6/2007 | Ehlers |
| 2007/0291034 | A1 | 12/2007 | Dones |
| 2008/0002190 | A1 | 1/2008 | Romain et al. |
| 2008/0059061 | A1 | 3/2008 | Lee |
| 2008/0319644 | A1 | 12/2008 | Zehler |
| 2009/0119001 | A1 | 5/2009 | Moussaeiff et al. |
| 2010/0004805 | A1 | 1/2010 | Denis et al. |
| 2010/0094537 | A1* | 4/2010 | Goto .................. G01C 21/3415 701/533 |
| 2010/0109918 | A1 | 5/2010 | Liebermann |
| 2010/0145922 | A1 | 6/2010 | Yoon et al. |
| 2010/0235082 | A1 | 9/2010 | Taniyama et al. |
| 2010/0268450 | A1 | 10/2010 | Evanitsky |
| 2011/0022304 | A1 | 1/2011 | Lee |
| 2011/0130956 | A1 | 6/2011 | Tracton et al. |
| 2011/0172909 | A1 | 7/2011 | Kahn et al. |
| 2011/0257877 | A1 | 10/2011 | Liu et al. |
| 2012/0004841 | A1 | 1/2012 | Schunder |
| 2012/0066202 | A1 | 3/2012 | Hatazawa et al. |
| 2012/0111222 | A1 | 5/2012 | Zambelli |
| 2012/0221168 | A1 | 8/2012 | Zeng et al. |
| 2012/0310520 | A1* | 12/2012 | Kanno ............... G01C 21/3423 701/400 |
| 2013/0073202 | A1 | 3/2013 | Zheng et al. |
| 2013/0200992 | A1 | 8/2013 | Kim |
| 2014/0005921 | A1 | 1/2014 | Voronel et al. |
| 2014/0081881 | A1 | 3/2014 | Radhakrishnan |
| 2014/0181715 | A1 | 6/2014 | Axelrod et al. |
| 2014/0188788 | A1 | 7/2014 | Bridgen et al. |
| 2014/0200805 | A1 | 7/2014 | Modica et al. |
| 2014/0249747 | A1 | 9/2014 | Kosseifi et al. |
| 2014/0278616 | A1 | 9/2014 | Stone et al. |
| 2014/0372904 | A1 | 12/2014 | Liu et al. |
| 2015/0006072 | A1 | 1/2015 | Goldberg et al. |
| 2015/0015024 | A1 | 1/2015 | Cremers et al. |
| 2015/0051832 | A1 | 2/2015 | Modica et al. |
| 2015/0142302 | A1* | 5/2015 | Kudo ................. G01C 21/3461 701/424 |
| 2015/0285649 | A1 | 10/2015 | Zhang et al. |
| 2016/0231129 | A1* | 8/2016 | Erez .................. G01C 21/3423 |
| 2016/0260436 | A1 | 9/2016 | Lemay et al. |

OTHER PUBLICATIONS

"Is there a way to search for stuff along a route?", Google Product Forums, Google Maps and Earth Help Forum, https://productforums.google.com/forum/#!topic/maps/1Lal3rlB6ps, Aug. 27, 2013, Retrieved Oct. 7, 2015, 2 pages.

"See traffic, transit, bicycling, and terrain on the map", Google Maps Help, Google Maps Forum, https://support.google.com/maps/answer/3092439?hl=en[Aug. 2, 2016 15:21:19], Available as early as Mar. 11, 2014, 3 pages.

Leber, J. "A Mapping App That Searches Along Your Route to Plan Exciting (or Efficient) Trips", https://www.fastcoexist.com/3035205/a-mapping-app-that-searches-along-your-route-to-plan-exciting-or-efficient-trips, CoExist website, Sep. 10, 2014, 3 pages.

Barker, P. "Using Here for Android to get around with transit and on foot". HERE 360 website, http://360.here.com/2014/10/22/using-android-get-around-transit-foot/, Oct. 22, 2014, 12 pages.

Welch, C., "iOS 9 brings public transit directions to Apple Maps", The VERGE website, http://www.theverge.com/2015/6/8/8731953/ios-9-transit-directions-apple-maps-announced, Jun. 8, 2015, 3 pages.

Hunter, T. et al., "The path interference filter: model-based low-latency map matching of probe vehicle data", Algorithmic Foundations of Robotics X, Springer Berlin Heidelberg, Jun. 20, 2012, pp. 591-607.

ISA European Patent Office, International Search Report and Written Opinion Issued in PCT Application No. PCT/US2017/037084, dated Sep. 12, 2017, WIPO, 15 pages.

ISA European Patent Office, International Search Report and Written Opinion issued in PCT Application No. PCT/US2017/030707, WIPO, dated Sep. 20, 2017, 11 pages.

Foell, S. et al., "Micro-Navigation for Urban Bus Passengers: Using the Internet of Things to Improve the Public Transport Experience," In Proceedings of the First International Conference on IoT in Urban Space, Oct. 27, 2014, Rome, Italy, 6 pages.

* cited by examiner

US 10,060,752 B2

DETECTING DEVIATION FROM PLANNED PUBLIC TRANSIT ROUTE

BACKGROUND

Navigating public transit in unfamiliar areas can be difficult for users. Previous solutions include receiving a destination from a user, and presenting the user with a route from the user's current location to the destination. In these solutions, the user may be presented with a public transportation route that includes that route's nearby stops and a schedule for the selected public transportation route. However, even with these technologies, users may make mistakes and fail to follow the route precisely. This can lead to a user riding public transportation too far to an unfamiliar area, or exiting public transportation too soon in an unfamiliar area, for example. Such mistakes can cost valuable time, and cause users to become disoriented and frustrated. Gathering one's bearings after such mistakes are made can be a challenging task.

SUMMARY

To address the issues discussed above, a mobile computing device is provided. The mobile computing device may include a processor configured to determine a recommended route for a user of the mobile computing device to travel from a first location to a second location, the recommended route including at least a public transportation segment, detect position information for the user of the mobile computing device, detect an off-route condition during the public transportation segment based on the position information, the off-route condition indicating that the user has deviated from the recommended route during the public transportation segment by a predetermined threshold, and based on at least detecting the off-route condition during the public transportation segment, programmatically determine a new route to the second location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
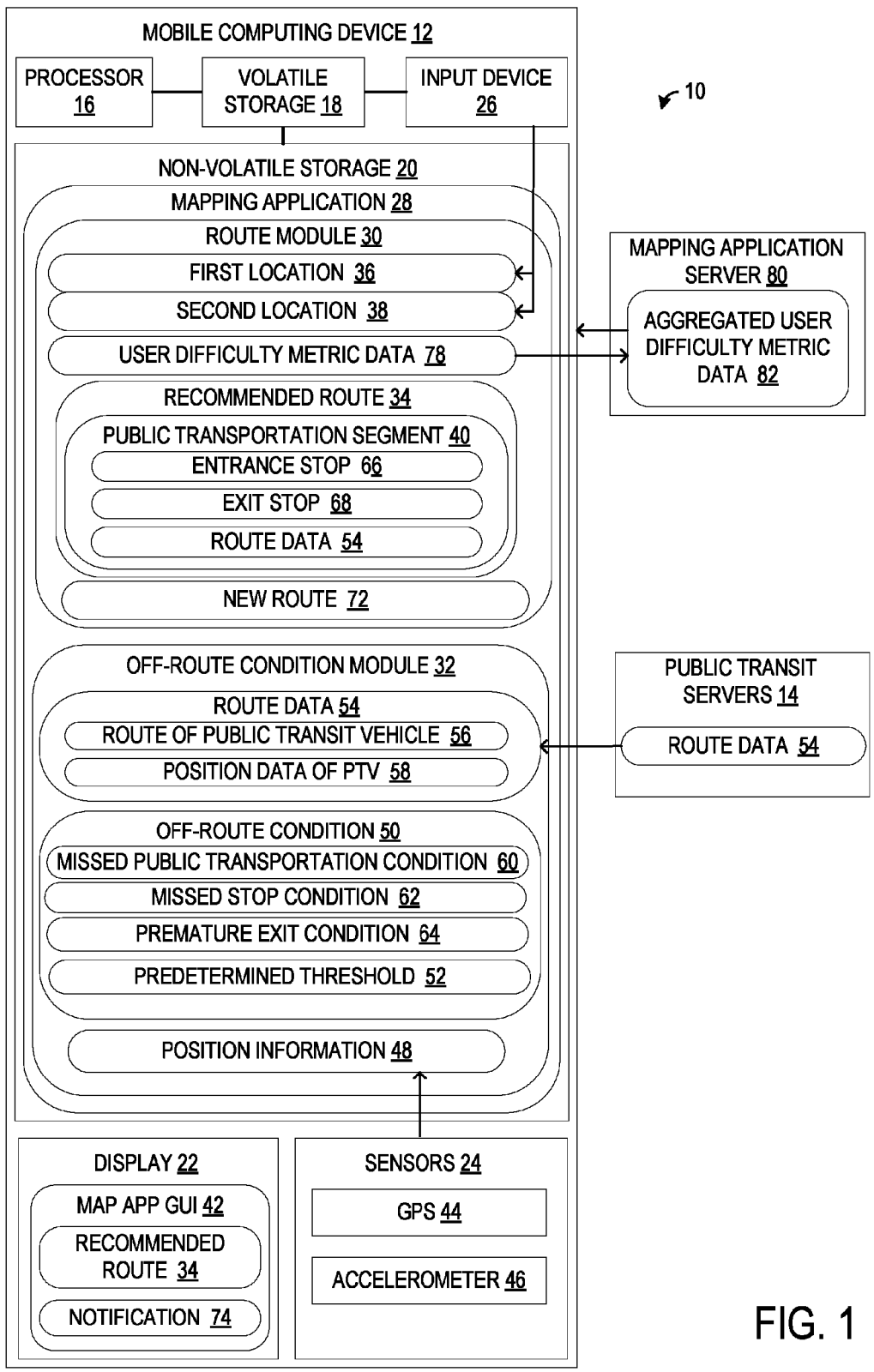
FIG. 1 show an example computing system for detecting deviation from a planned public transportation route according to an embodiment of the present description.

FIG. 1 illustrates a computing system 10 according to one embodiment of the present disclosure. As shown, the computing system 10 includes a mobile computing device 12 in communication with public transit servers 14. The mobile computing device 12 may, for example, take the form of a smart phone device, a tablet computing device, a wrist-mounted computing device, a head-mounted computing device, a location aware laptop computing device, etc.

The mobile computing device 12 includes a processor 16, a volatile storage 18, a non-volatile storage 20, a display 22, sensors 24, and an input device 26. The processor 16 is configured to execute instructions for a mapping application 28 stored by non-volatile storage 20 including a route module 30 and an off-route condition module 32. The route module 30 executed by the processor 16 is configured to determine a recommended route 34 for a user of the mobile computing device 12 to travel from a first location 36 to a second location 38, the recommended route 34 including at least a public transportation segment 40. The first location and the second location are typically received as inputs from the user, via a graphical user interface displayed on a display of the mobile computing device. In one embodiment, the mapping application 28 executed by the processor 16 is configured to receive these inputs and display the determined recommended route 34 to the user via a mapping application graphical user interface (GUI) 42 presented to the user on the display 22 of the mobile computing device 12.

Figure 2:
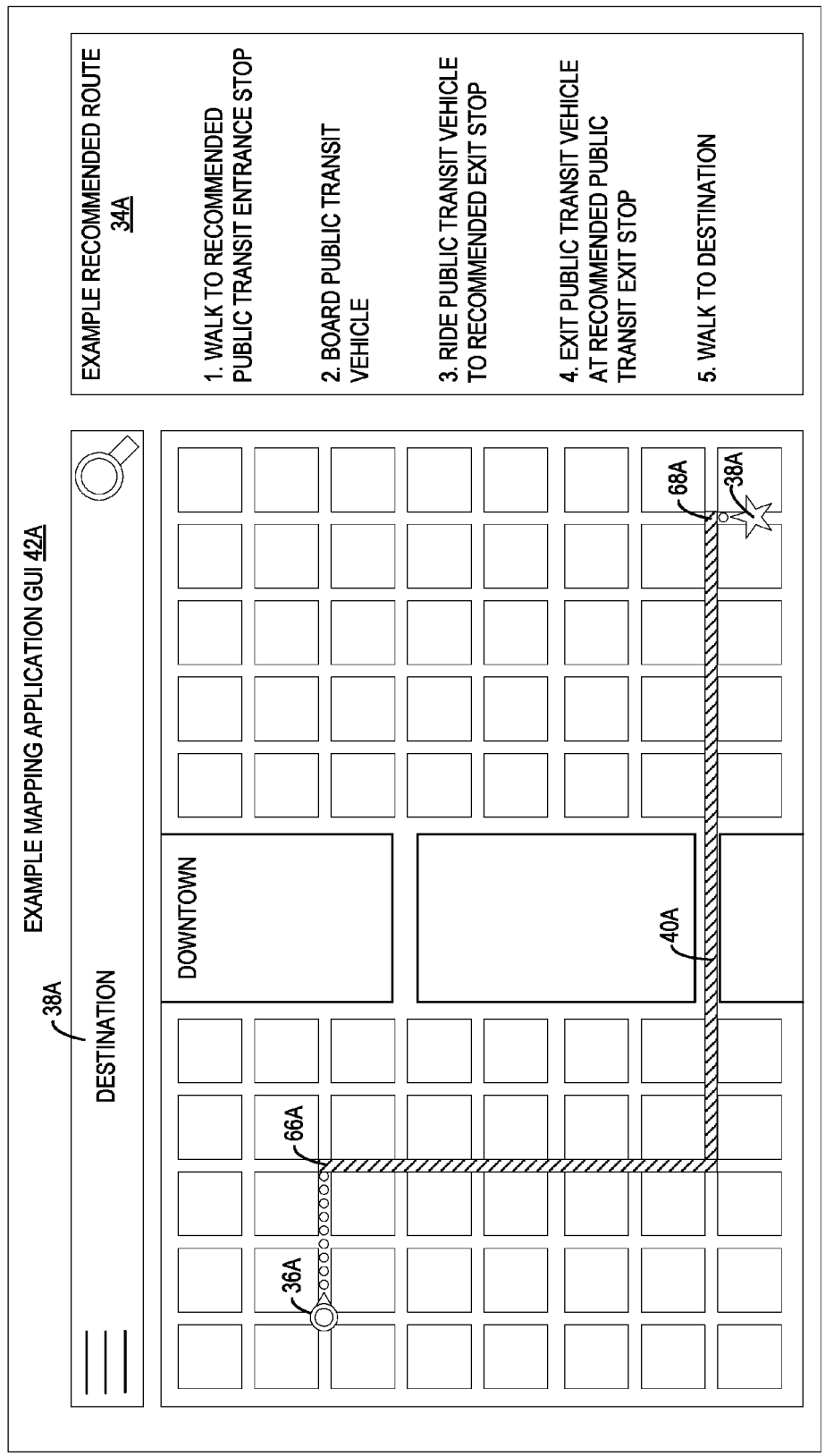
FIG. 2 shows an example mapping application graphical user interface of the computing system of FIG. 1.

Turing briefly to FIG. 2, an example mapping application GUI 42A is illustrated. As shown, an example recommended route 34A is presented to the user via the example mapping application GUI 42A. In the illustrated embodiment, the user's current location 36A is detected by sensors 24 of the mobile computing device 12 and input to the route module 30 as the first location 36, and a user entered destination 38A is input to the route module 30 as the second location 38. Thus, the mapping application 28 executed by the processor 16 is configured to determine the recommended route 34A to travel from the user's current location 36A to the user entered destination 38A. As shown, the example recommended route 34A comprises several steps including one public transportation section 40A, which, for example, may be a particular bus route that has bus stops near the user's current location 36A and the user entered destination 38A. It will be appreciated that the first location 36 is not limited to the user's current location 36A, but may also, for example, include a user entered location such as a street address.

Turning back to FIG. 1, the user's current location 36A is detected by the sensors 24, which, for example, may include global positioning system (GPS) sensors 44 and accelerometer sensors 46. However, it will be appreciated that the user's current location 36A may be determined using another other suitable sensors and methods, such as determining the user's current location via detected nearby local area networks, triangulation by cellphone towers, etc. The user entered destination 38A may be input by the user via the input device 26, which, for example, may take the form of a microphone, a keyboard, a capacitive matrix built into the display 22 in a capacitive touch screen configuration, etc.

In addition to the user's current location 36A, the mobile computing device 12 is configured to detect other types of positional information of the user via the sensors 24. In the illustrated embodiment, the processor 16 is configured to detect position information 48 for a user of the mobile computing device 12. For example, the position information 48 includes geographical location, heading, and speed of the user of the mobile computing device 12 that is detected via sensors 24 including GPS sensors 44 and the accelerometer 46. The detected position information 48 is sent to the off-route condition module 32 in a stream of position information 48.

The off-route condition module 32 executed by the processor 16 is configured to detect an off-route condition 50 during the public transportation segment 40 based on the position information 48, the off-route condition 50 indicating that the user has deviated from the recommended route 34 during the public transportation segment 40 by a predetermined threshold 52. For example, the predetermined threshold 52 may be a threshold period of time that the user has not followed the recommended route 34, such as, for example, 20 seconds, 30 seconds, 40 seconds, or another suitable period of time. As another example, a threshold distance that the user's geographical location has deviated from the recommended route 34, such as, for example, fifty feet, one hundred feet, two hundred feet, or another distance suitable for an accuracy of the GPS sensors and location detection software of the mobile computing device. As another example, a threshold amount of speed over or under an expected speed of a public transit vehicle that the user is traveling at, such as, for example, 60% over or under the expected speed of a public transit vehicle on that route. As another example, a threshold difference in heading for the user compared to the recommended route, such as, for example, sixty degrees, ninety degrees, or another threshold difference in heading that it suitable for heading detection software of the mobile computing device. It will be appreciated that the examples of predetermined thresholds 52 discussed above are merely illustrative, and other types of predetermined thresholds 52 not specifically discussed above may also be utilized to detect the off-route condition 50.

In the embodiment illustrated in FIG. 1, to detect an off-route condition 50 during the public transportation segment 40, the processor 16 is further configured to retrieve route data 54 for a public transit vehicle corresponding to the public transportation segment 40, the route data including a route of the public transit vehicle 56. As shown, the route data 54 may be received by the route module 30 and the off-route condition module 32 to determine whether the user has deviated from the public transportation segment 40 of the recommended route 34 by the predetermined threshold 52. The route data 54 may include other data, such as, for example, position data of the public transit vehicle 58 corresponding to the public transportation segment 40, a time schedule for the public transit vehicle, expected detours for the public transit vehicle, or another other suitable type of route data.

Using the route data 54, the off-route condition module 32 executed by the processor 16 is configured to compare position information 48 for the user of the mobile computing device 12 to the retrieved route data 54. For example, the off-route condition module 32 may compare position information 48 for the user of the mobile computing device 12 to the route of the public transit vehicle 56 to determine whether the user's geographical location has deviated from the route of the public transit vehicle 56 by a predetermined threshold 52, which may be a predetermined distance threshold in this example. In another example, the off-route condition module 32 may compare a speed of the user of the mobile computing device 12 to an expected speed of the public transit vehicle along the route of the public transit vehicle 56, and determine that the user is off-route if the user's speed is below the expected speed of the public transit vehicle by the predetermined threshold 52. For example, if the user's detected speed is less than 60% of the expected speed of the public transit vehicle, then the off-route condition module 32 may determine that the user is off route. In this example, the expected speed of the public transit vehicle may be determined based on an average speed of the public transit vehicle for that route which may be stored in the route data 54, a recent speed of the public transit vehicle on that route which may also be stored in a periodically updated route data 54, traffic conditions, weather conditions, time of day, known construction zones, known detours, etc. It will be appreciated that the examples discussed above are merely illustrative, and other methods of detecting the off-route condition 50 may be used by the off-route condition module 32, including methods discussed below.

As shown in FIG. 1, the off-route condition 50 may comprise multiple different types of off-route conditions, including a missed public transportation condition 60, a missed stop condition 62, and a premature exit condition 64. It will be appreciated that the public transportation segment 40 of the recommended route 34 includes a recommended public transit entrance stop 66 for the user to enter the public transit vehicle. If the user fails to board the public transportation at the recommended public transit entrance stop, the off-route condition 50 will include a missed public transportation condition (i.e., may set a missed public transportation condition variable to a TRUE value) 60 indicating that the user did not enter the public transit vehicle at the recommended public transit entrance stop 66.

Briefly turning to FIG. 2, the example recommended route 34A includes an example recommended public transit entrance stop 66A, which, in this example, is a stop nearest to the current position of the user 36A along the route of the public transit vehicle 56 included in the retrieved route data 54. However, it will be appreciated that the recommended public transit entrance stop 66 may be selected via other methods, such as a stop that is easiest to walk to from the user's current location, or a stop that is safest to walk to from the user's current location via dedicated pedestrian walkways, etc.

Figure 3:
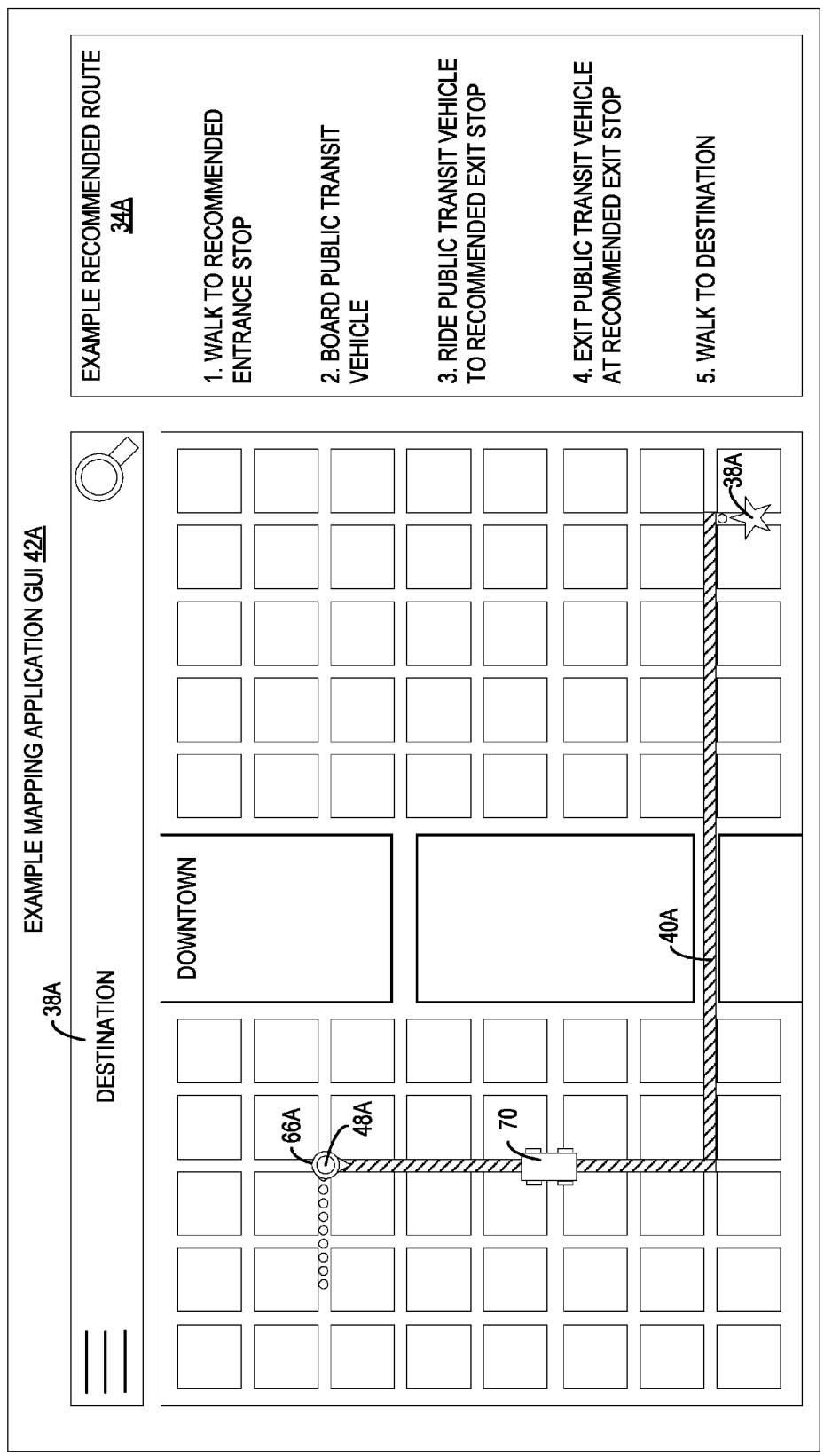
FIG. 3 shows another example mapping application graphical user interface of the computing system of FIG. 1.

Now turning to FIG. 3, to detect the missed public transportation condition 60, the processor 16 is configured to determine that the public transit vehicle has arrived at the recommended public transit entrance stop 66 based on the route data 54. In the illustrated example, the public transit vehicle 70 corresponding to the example public transportation route 40A of the recommended route 34A has already arrived at and passed the example recommended public transit entrance stop 66. Thus, to detect the missed public transportation condition 60, the processor 16 is configured to determine that the position information 48 for the user indicates that the user has not followed the route of the public transit vehicle 56 for a predetermined threshold 52 time period. In the illustrated example of FIG. 3, the user's geographical position and heading 48A from the position information 48 indicates that the user is still located at the example recommended public transit entrance stop 66A after the public transit vehicle 70 has already arrived and left. After a predetermined threshold 52 time period has passed without the user's geographical position and heading 48A following the route of the public transit vehicle, then the processor 16 determines that the missed public transportation condition 60 has been fulfilled and the user is off-route. It will be appreciated that the predetermined threshold 52 time period may be a suitable time period, such as 30 seconds, 1 minutes, 5 minutes, etc.

Further in the embodiment of FIG. 1, the public transportation segment 40 of the recommended route 34 includes a recommended public transit exit stop 68 for the user to exit the public transit vehicle. Thus, in the event the user misses a stop, the off-route condition 50 may include a missed stop condition 62 (i.e., may set a missed stop condition variable to a TRUE value), indicating that the user did not exit the public transit vehicle at the recommended public transit exit stop 68. Briefly turning back to FIG. 2, the example recommended route 34A includes an example recommended public transit exit stop 68A, which, in this example, is a stop nearest to the user entered destination 38A along the route of the public transit vehicle 56 included in the retrieved route data 54. However, it will be appreciated that the recommended public transit exit stop 66 may be selected via other methods, such as a stop that is easiest to walk to the second location 38, or a stop that is safest to walk to second location 38 using dedicated walkways, etc.

Figure 4:
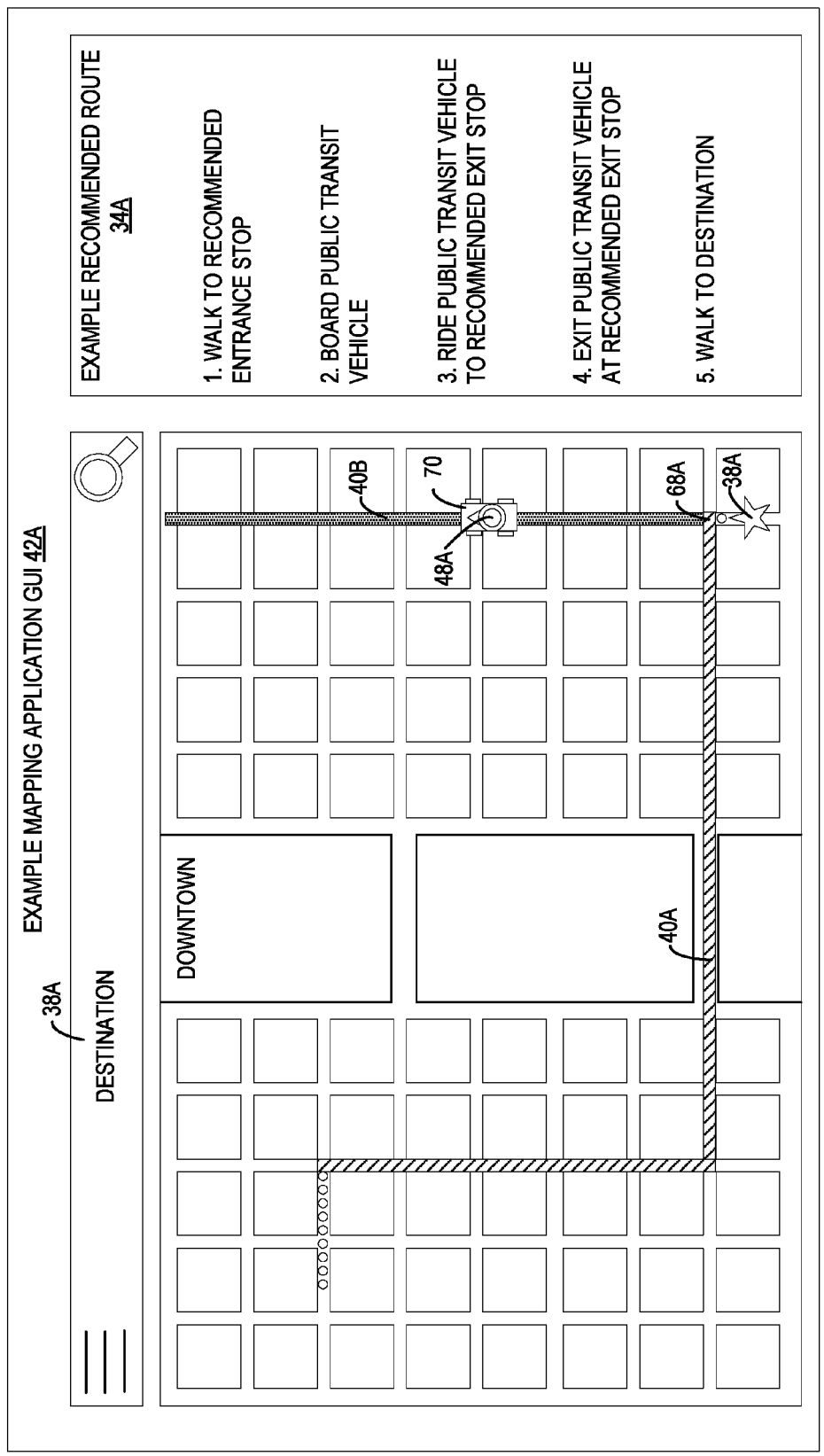
FIG. 4 shows another example mapping application graphical user interface of the computing system of FIG. 1.

Now turning to FIG. 4, to detect the missed stop condition 62, the processor 16 is configured to determine a post exit portion of the route of the public transit vehicle 56 beyond the recommended public transit exit stop 68. In the illustrated example, the public transit vehicle 70 corresponding to the route of the public transit vehicle 56 of the example recommended route 34A has already passed the example recommended public transit exit stop 68A. Additionally, the processor 16 has determined the example post exit portion 40B beyond the example recommended public transit exit stop 68A. Thus, to detect the missed stop condition 62, the processor 16 is configured to determine that the position information 48 for the user indicates that the user has followed the post exit portion of the route for a predetermined threshold 52 time period. In the illustrated example of FIG. 4, the user's geographical position and heading 48A from the position information 48 for the user indicates that the user is moving along the example post exit portion 40B of the route. After a predetermined threshold 52 time period has passed with the user's geographical position and heading 48A continuing to follow example post exit portion 40B of the route, then the processor 16 determines that the missed stop condition 62 has been fulfilled and the user is off-route.

Further in the embodiment of FIG. 1, the off-route condition 50 may include a premature exit condition 64 indicating that the user exited the public transit vehicle before the recommended public transit exit stop 68. In this embodiment, to detect the premature exit condition 64, the processor 16 is configured to determine a pre exit portion of the route of the public transit vehicle before the recommended public transit stop 68, which is utilized as described below.

Figure 5:
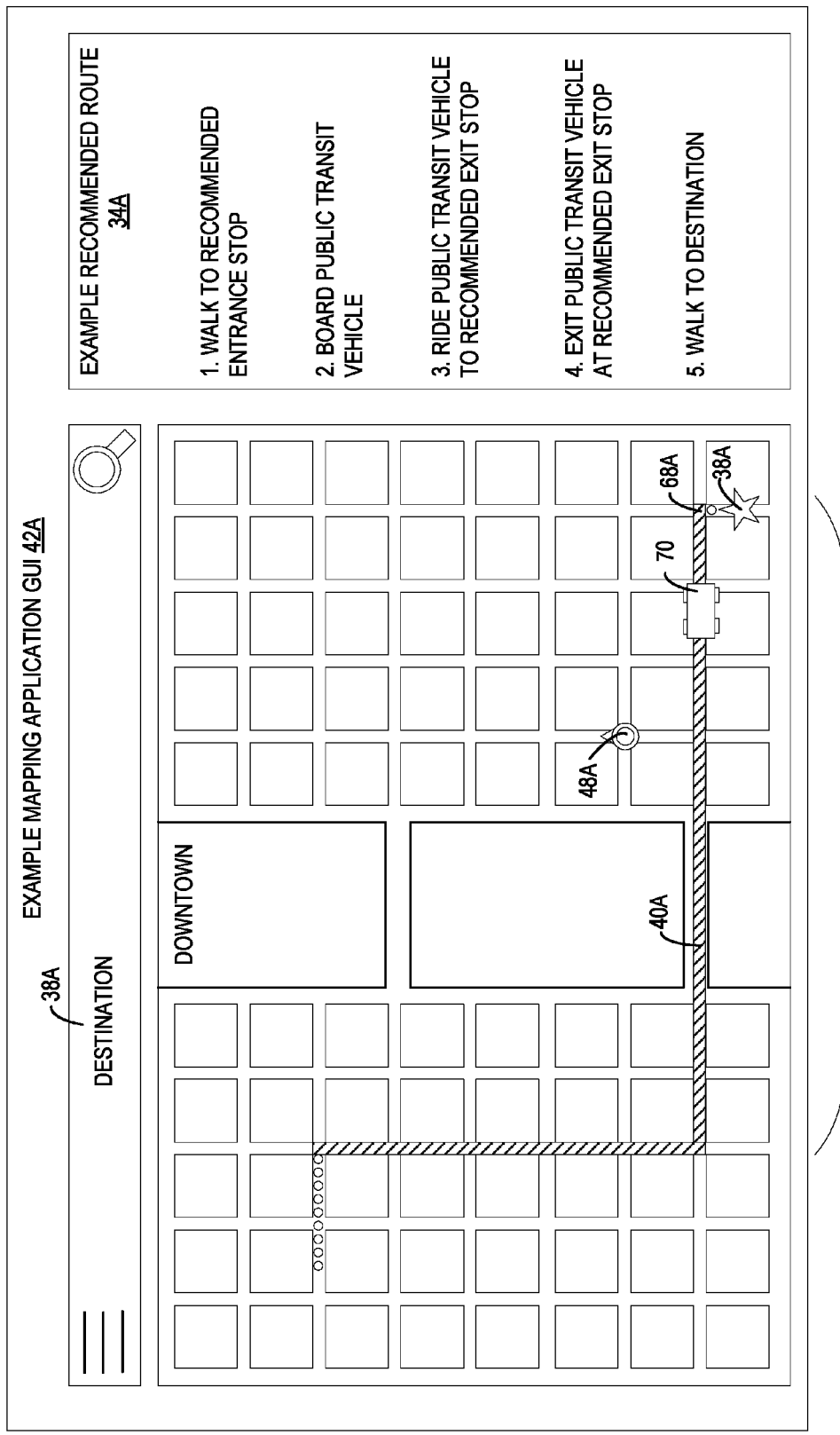
FIG. 5 shows another example mapping application graphical user interface of the computing system of FIG. 1.

Turning to FIG. 5, in the illustrated example, the public transit vehicle 70 corresponding to the route of the public transit vehicle 56 of the example recommended route 34A has not yet passed the example recommended public transit exit stop 68A. Additionally, the processor 16 has determined the example pre exit portion 40C of the route for the example public transportation segment 40A before the example recommended public transit exit stop 68A. Thus, to detect the premature exit condition 64, the processor 16 is configured to determine that the position information 48 for the user indicates that the user has not followed the pre exit portion of the route of the public transit vehicle for a predetermined threshold 52 time period. In the illustrated example of FIG. 5, the user's geographical position and heading 48A from the position information 48 for the user indicates that the user has a geographical location and heading that has deviated from the example pre exit portion 40C of the route for the example public transportation segment 40A. After a predetermined threshold 52 time period has passed with the user's geographical position and heading 48A continuing to deviate from the example pre exit portion 40C of the route, then the processor 16 determines that the premature exit condition 64 has been fulfilled and the user is off-route.

Now turning back to FIG. 1, based on at least detecting the off-route condition 50 during the public transportation segment 40, the processor 16 is configured to programmatically determine a new route 72 to the second location 38. Typically, this programmatic determination is performed without any required prompting or user input from the user. In other embodiments, a prompt (e.g., "IT APPEARS YOU'RE NO LONGER ON THE RECOMMENDED PUBLIC TRANSPORTATION ROUTE, DISPLAY NEW ROUTE FROM CURRENT LOCATION?" or "PUBLIC TRANSIT ROUTE DEVIATED. GET A NEW ROUTE?") may be programmatically displayed, which the user may select to cause the new route to be displayed. The new route 72 may be determined via the same methods as the recommended route 34 discussed above. It will be appreciated that the new route 72 may include a new public transportation segment 40, or may contain no public transportation segment 40. For example, if the user has deviated from the recommended route 34, but is still near the second location 38, the new route 72 may direct the user to walk to the second location 38.

In one embodiment, based on at least detecting the off-route condition 50 during the public transportation segment 40, rather than immediately rerouting the user, the processor 16 may be configured to present the user with an off-route notification 74 indicating that the user has deviated from the recommended route 34. For example, the off-route notification 74 may include a visual notification presented to the user via the display 22. Alternatively or additionally to the visual notification, an audio notification, or a haptic notification such as a vibration may also be presented to the user.

Figure 6:
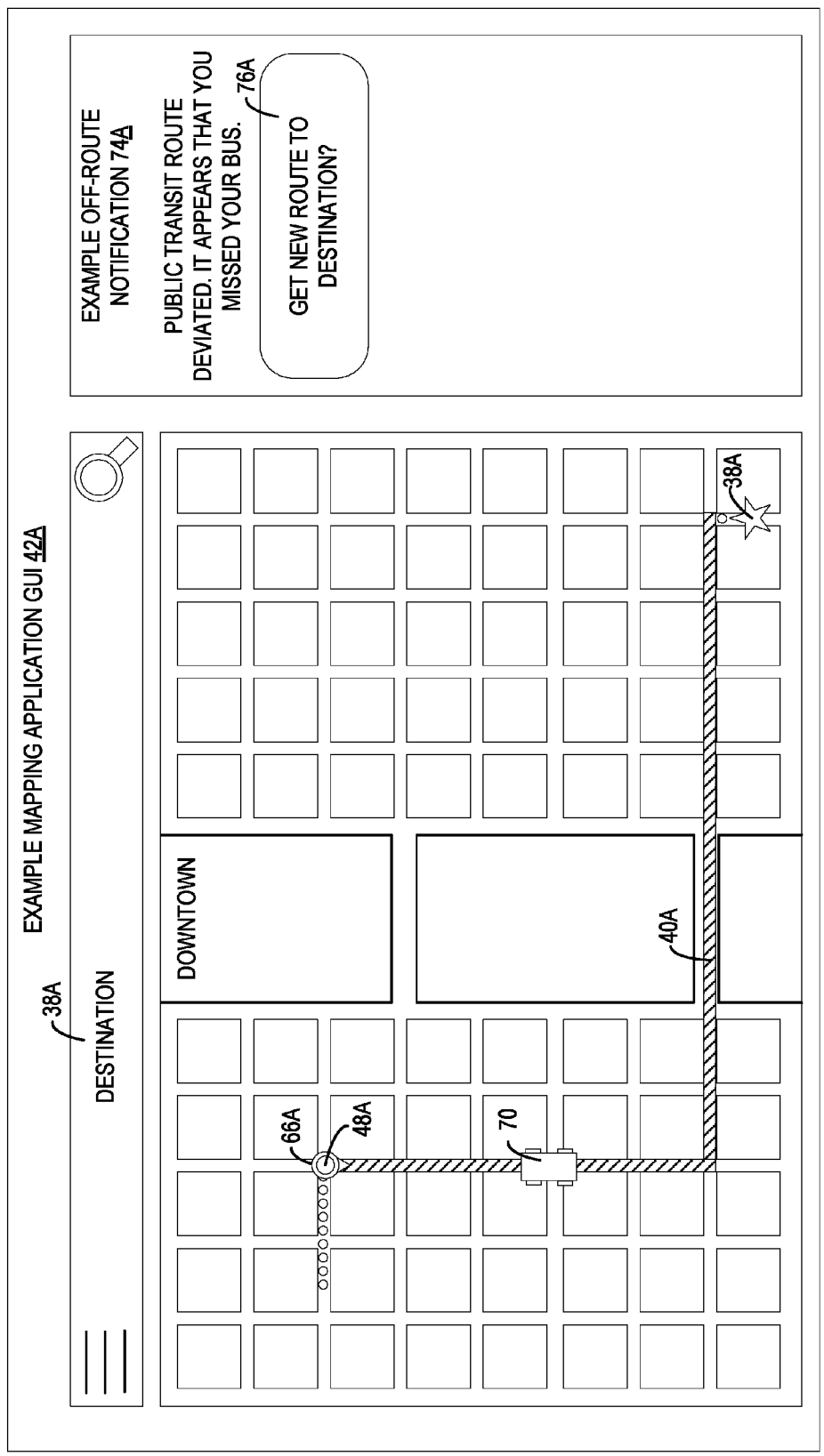
FIG. 6 shows another example mapping application graphical user interface including an example off-route notification of the computing system of FIG. 1.

FIG. 6 illustrates an example off-route notification 74A. As shown, the example off-route notification 74A includes a visual notification that is displayed to the user via the example mapping application GUI 42A on the display 22 of the mobile computing device 12. In the illustrated example, the user's geographical position and heading 48A from the position information 48 indicates that the user is still located at the example recommended public transit entrance stop 66A after the public transit vehicle 70 has already arrived and left. Thus, as discussed above, the processor 16 determines that the missed public transportation condition 60 has been fulfilled and the user is off-route. Based on at least detecting the missed public transportation condition, the processor 16 displays the example off-route notification 74A including the visual notification of "PUBLIC TRANSIT ROUTE DEVIATED. IT APPEARS THAT YOU MISSED YOUR BUS." It will be appreciated that the content of the visual notification may alternatively or additionally be output through speakers of the mobile computing device 12.

Further in this embodiment, the off-route notification 74 includes a reroute input, and the processor 16 is further configured to receive the reroute input from the user of the mobile computing device 12, and programmatically determine a new route 72 to the second location 38. In the example illustrated in FIG. 6, the example off-route notification 74A is a visual notification that includes a virtual button 76A that the user may press to initiate the rerouting. As shown, the virtual button 76A may itself include visual content such as "GET NEW ROUTE TO DESTINATION?" to prompt the user to interact with the virtual button 76A. In another example, the user may input a voice command to the input device 26 to initiate the rerouting. However, it will be appreciated that any suitable input method may be used to receive the reroute input.

Figure 7:
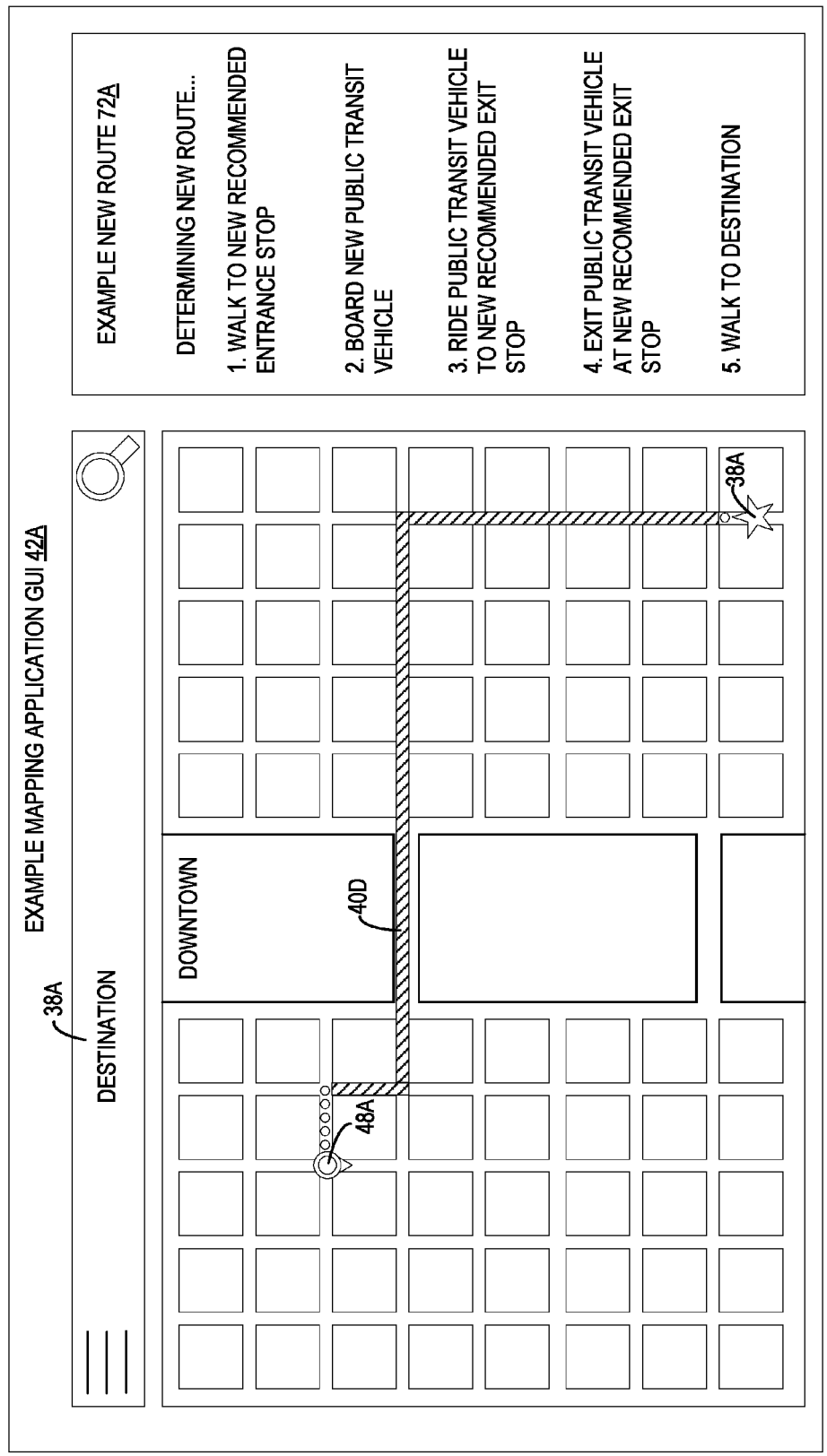
FIG. 7 shows another example mapping application graphical user interface including an example new route of the computing system of FIG. 1.

Now turning to FIG. 7, based on at least detecting the off-route condition 50 during the public transportation segment 40 or receiving the reroute input from the user of the mobile computing device 12, the processor 16 is configured to determine a new route 72 to the second location 38. FIG. 7 illustrates an example new route 72A from the user's geographical position and heading 48A to the user entered destination 38A. It will be appreciated that the user's current geographical position may be different from the first location 36 of the initial recommended route. Thus, the processor 16 may determine the new route 72 to travel from the user's current geographical location as the new first location to the original second location, which is the user entered destination 38A in the example illustrated in FIG. 7.

As shown in FIG. 7, the example new route 72A includes a new public transportation segment 40D, which may be determined according to the same methods discussed above. Similarly, the processor 16 may be configured to detect the off-route condition 50 during the new public transportation segment 40D of the example new route 72A, and determine a second new route accordingly. However, it will be appreciated that the new route 72 may, in some examples, not have a new public transportation segment.

Figure 8:
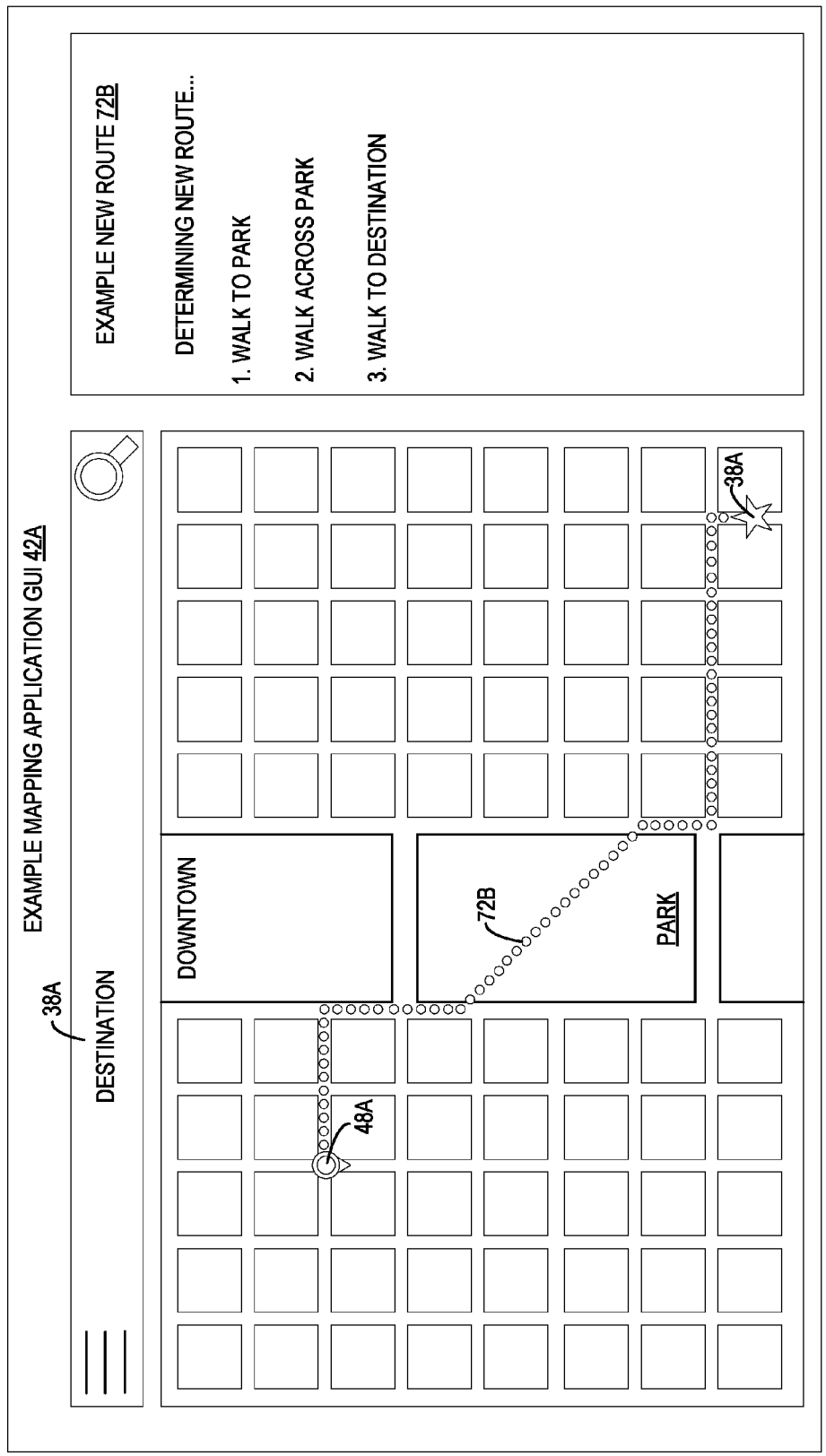
FIG. 8 shows yet another example mapping application graphical user interface including another example new route of the computing system of FIG. 1.

FIG. 8 illustrates an example new route 72B that does not include a new public transportation segment. As shown in FIG. 8, the new route 72B consists of directions for the user of the mobile computing device 12 to walk from the user's current location to the user entered destination 38A. As the user is walking, it will be appreciated that the new route 72 may include directions to that are possible for pedestrians but not vehicles, such as walking across the park along walking paths rather than only following streets.

In one example, based on the route data 54 retrieved from the public transit servers 14, the mapping application 28 executed by the processor 16 may determine that there are currently no public transit vehicles scheduled that have routes that include stops near the user's current location and/or the user entered destination 38A. In another example, the user may have missed the last public transit vehicle with a suitable route for that day. In yet another example, the next scheduled public transit vehicle with a suitable route may take longer than it would take for the user to walk to the destination (i.e. next bus is in 1 hour and it would take 10 mins to walk). Thus in these examples, the mapping application 28 may be configured to determine a new route 72, such as new route 72B, that does not include a new public transportation segment. It will be appreciated that the examples discussed above are merely illustrative, and other scenarios for determining new routes 72 that do not include public transportations segments not specifically discussed above may also be utilized by mapping application 28.

As another example, while determining the new route 72B, the processor 16 may be configured to calculate a distance between the user's current location and the user entered destination 38A. If the distance is less than a predetermined distance threshold, 500 feet for example, the processor 16 may be configured to determine the new route 72 without a new public transportation segment.

Figure 9:
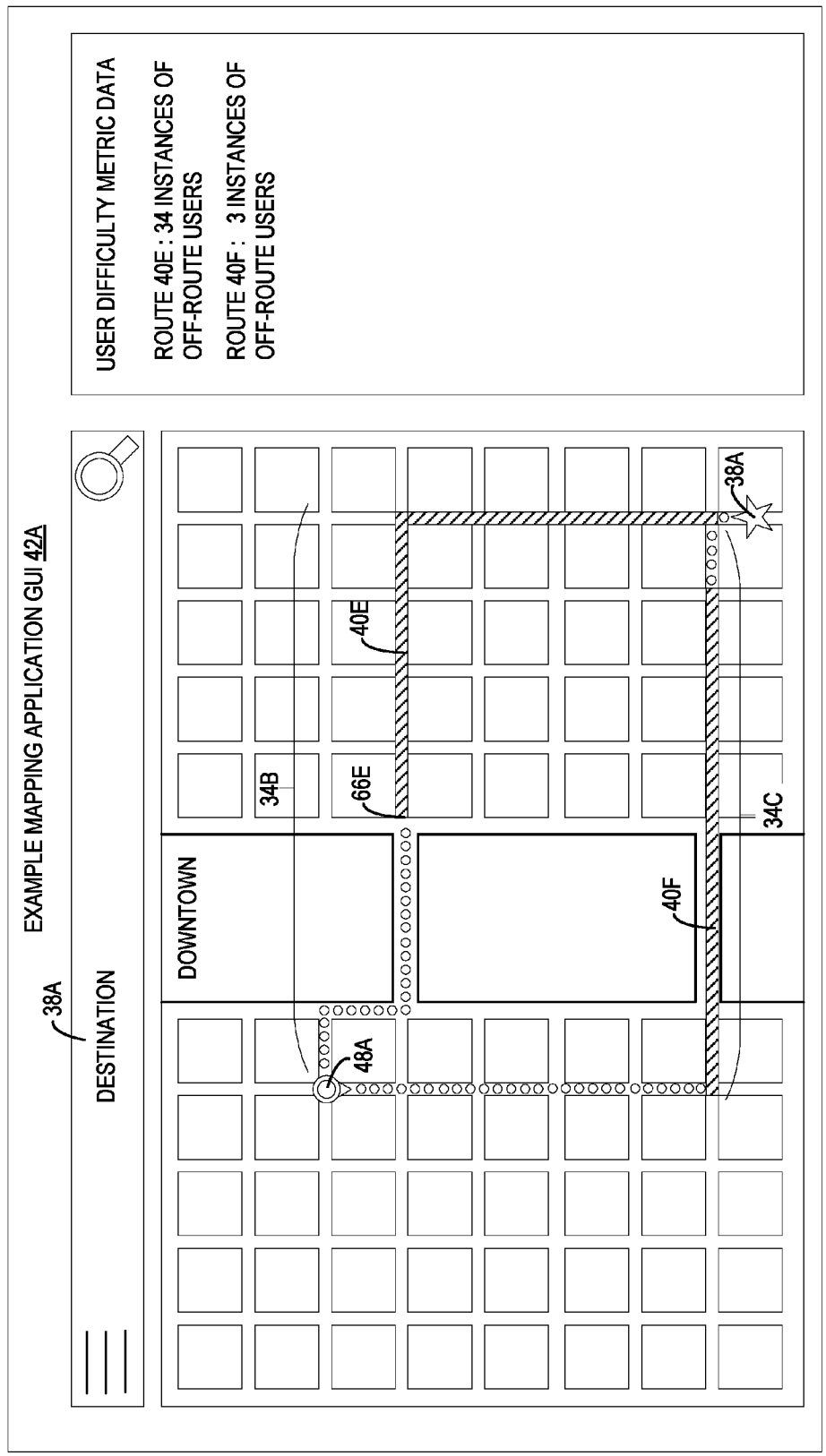
FIG. 9 shows yet another example mapping application graphical user interface of the computing system of FIG. 1.

Now turning to FIG. 9, the recommended route 34 may be determined based on a plurality of factors. For example, the mapping application 28 may be configured to select a particular public transit route for the public transit segment 40 of the recommended route 34 by, for example, ranking public transportation routes by the total distance between the first and second locations 36 and 38 from each route's nearest stops. Thus, the mapping application 28 may then select the public transit route that minimizes this distance, and would thus require the least amount of walking for the user. However, it will be appreciated that the public transit routes may be ranked according to other methods, such as ease and safety (e.g., does not require user to walk across busy road), or required time for whole route (e.g., bus is scheduled to arrive earlier, bus travels on a more direct route, or bus has less stops along the route, etc.).

In the example illustrated in FIG. 9, a route of a public transit vehicle for the public transportation segment 40 is selected based on user difficulty metric data 78 for that route of the public transit vehicle. The difficulty metric data 78 may be stored by the route module 30 of the mapping application 28. In one example, the mobile computing device 12 may be configured to communicate with a mapping application server 80 associated with the mapping application 28. In this example, the mapping application server 80 may be configured to receive user difficulty metric data 78 from a plurality of mobile computing devices 12 of a plurality of users. Thus, the mapping application server 80 may be configured to aggregate the user difficulty metric data 78 from a plurality of users to generate an aggregated user difficulty metric data 82. In this example, the mapping application 28 of the user's mobile computing device 12 may be configured to periodically request updates from the user difficulty metric data 78 from the mapping application server 80. In response to the request, or based on a periodic schedule, the mapping application server 80 may be configured to send the aggregated user difficulty metric data 82 to the user's mobile computing device 12 to update the user difficulty metric data 78 of mapping application 28 executed on the user's mobile computing device 12. As discussed above, a route of a public transit vehicle for the public transportation segment 40 of the recommended route 34 may be selected based on the user difficulty metric data 78. In one example, the user difficulty metric data 78 includes a metric for each public transportation route indicating how often users have been off-route during that public transportation route. In the illustrated example of FIG. 9, the user difficulty metric data 78 indicates that there have been 34 instances of off-route users for the route of public transportation segment 40E, and that there have been 3 instances of off-route users for the route of public transportation segment 40F. It will be appreciated that the users may have become off-route for different reasons. For example, a particular stop of the public transportation route may be difficult to reach, and thus the missed public transportation condition 60 has been frequently detected for that particular stop. Accordingly, the user difficulty metric data 78 may indicate that the particular stop of the public transportation route has frequently caused missed stops, and based on the user difficulty metric data 78, the route module 30 may be configured to not recommend that public transportation route or recommend that the user enter the public transit vehicle at a different stop along the route. Thus, the route module 30 is configured to determine the recommended route, including selecting the route of the public transit vehicle for the public transportation segment 40 based on the user difficulty metric data 78.

In the specific example illustrated in FIG. 9, the public transportation segment 40E of the potential recommended route 34B includes a nearest entrance stop 66E that has corresponding user difficulty metric data 78 indicating that users have missed that the public transit vehicle at that particular entrance stop 66E 34 times. For example, walking across the bridge to reach the nearest entrance stop 66E from the user's current geographical position 48A may be difficult (bridge does not have pedestrian walkways), or that bus stop is difficult to find, etc. Thus, the route module 30 may be configured to select an alternative public transportation route. In the illustrated example, the route module 30 may determine an alternative recommended route 34C that includes the public transportation segment 40F, which has corresponding user difficulty metric data 78 indicating that the route of the public transit vehicle for public transportation segment 40F has had less instances of user's becoming off-route compared to the public transportation segment 40E. Thus, even though the alternative recommended route 34C requires a longer distance of walking and may take longer than the potential recommended route 34B, the route module 30 may select the alternative recommended route 34C as the recommended route 34 based on the user difficulty metric data 78. It will be appreciated that the user difficulty metric data 78 is not limited to the missed public transportation condition 60, but may also be updated based on missed stop conditions 62, premature exit conditions 64, and other suitable off-route conditions 50.

Further in this example, based on at least detecting the off-route condition 50 during the public transportation segment 40, the processor 16 is further configured to modify user difficulty metric data 78 for the route of the public transportation segment 40 based on the detected off-route condition 50, such that the route of the public transit vehicle is less likely to be selected. Thus, each time an off-route condition 50 has been detected for the user, the mobile computing device 12 modifies the stored user difficulty metric data 78 to indicate that the route of the public transportation segment 40 has caused an instance of the user becoming off-route. It will be appreciated that the mapping application 28 may modify the user difficulty metric data 78 based on the type of off-route condition (missed public transportation condition 60, missed stop condition 62, premature exit condition 64, etc.). For example, if the off-route condition 50 is the missed public transportation condition 60, the mapping application 28 may modify the user difficulty metric data 78 to indicate that the particular entrance stop 66 of the public transportation segment 40 caused the missed public transportation condition 60.

As another example, if the off-route condition 50 is the missed stop condition 62, the mapping application 28 may modify the user difficulty metric data 78 to indicate that the particular exit stop 68 of the public transportation segment 40 caused the missed stop condition 62, such as, for example, because that particular exit stop is currently blocked off due to construction or is difficult to see for users. Thus, when selecting a public transportation segment 40, the route module 30 may be configured to select the route for the public transportation segment 40 based on user difficulty metric data 78 for individual stops along that route. It will be appreciated that the examples of user difficulty metric data 78 discussed above are merely illustrative, and other types modifications to the user difficulty metric data 78 not specifically discussed above may also be utilized for selecting public transportation segments 40.

Figure 10:
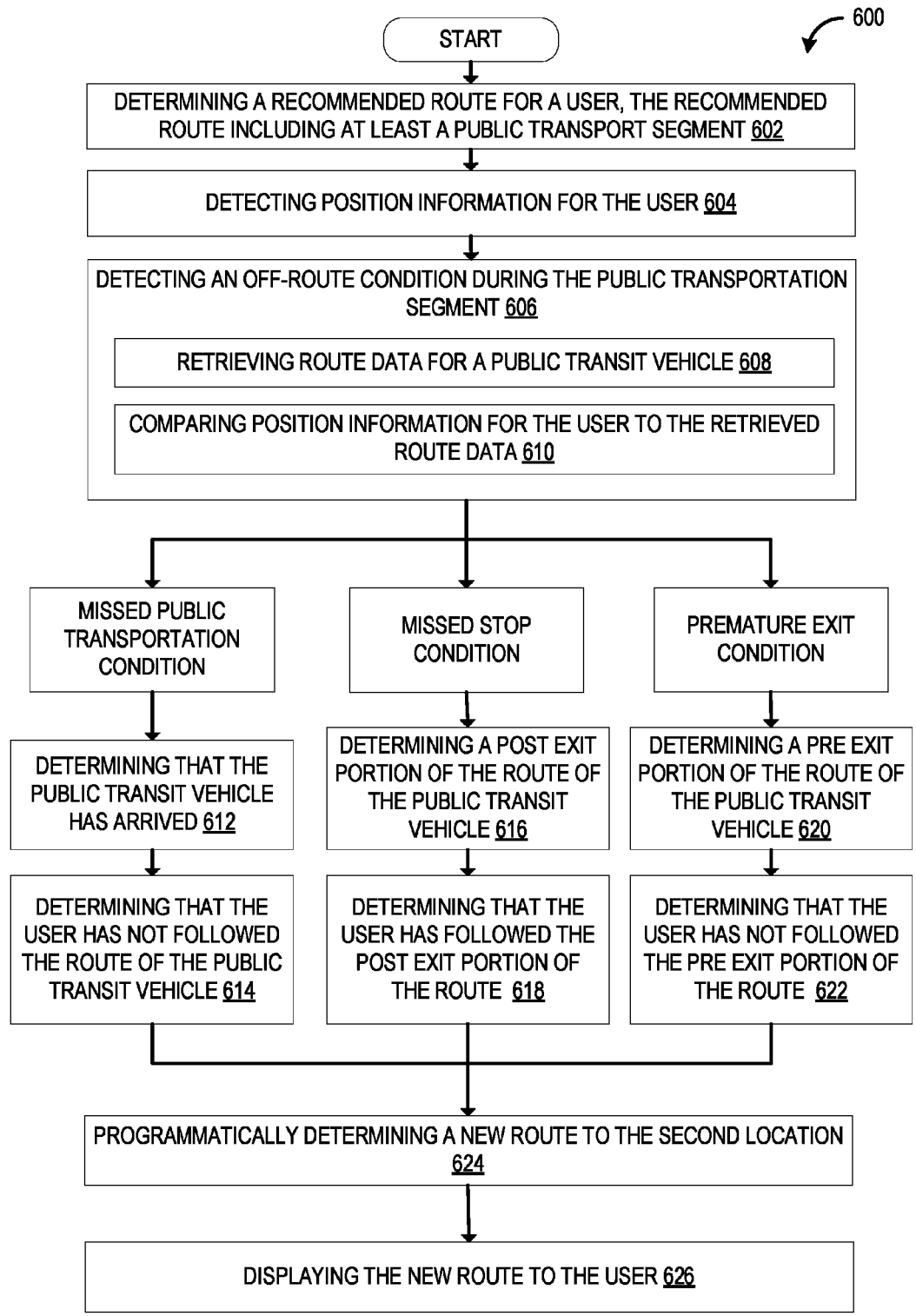
FIG. 10 shows an example method for detecting deviation from a planned public transportation route using the computing system of FIG. 1.

FIG. 10 shows an example method 600 according to an embodiment of the present description. Method 600 may be implemented on the computer system 10 described above or on other suitable computer hardware. At step 602, the method 600 may include determining a recommended route for a user to travel from a first location to a second location, the recommended route including at least a public transportation segment. As described above, public transportation follow known schedules and routes, and include buses and trains on scheduled routes, for example. Route data may be retrieved by the mobile computing device 12 by querying servers for location public transportation and requesting route schedules, locations of stops for each route, etc. This may be accomplished at least in part by storing, on mobile computing device 12, a database of electronic address for servers corresponding to the public transportation services of each city and state. Thus, the processor may be configured to determine the user's current geographical location, including the user's city and state, according to GPS data of the mobile computing device 12, querying the database to retrieve the corresponding electronic address for the public transportation server for that city and state, and requesting the route data discussed above. The mapping application 28 may then select a particular public transit route by, for example, ranking public transportation routes by the total distance between the first and second locations 36 and 38 from each route's nearest stops. Thus, the mapping application 28 may then select the public transit route that minimizes this distance, and would thus require the least amount of walking for the user. However, it will be appreciated that the public transit routes may be ranked according to other methods, such as ease and safety (does not require user to walk across busy road), or required time for whole route (bus is scheduled to arrive earlier).

Advancing from step 602 to step 604, the method 600 may include detecting position information for the user. In method 600, the position information for the user may be selected from the group consisting of geographical location, heading, and speed. This may be accomplished in part by GPS sensors 44, accelerometers 46, and other sensors 24 of the mobile computing device 12. For example, the mapping application 28 executed by the processor 16 may be configured to determine a course location (i.e. within 10 meters of user's actual location) for the user based on GPS data or by querying a database that matches known WIFI connections to general locations, and refine the user's course location based on accelerometer data (i.e. user has moved 1 meter).

Proceeding from step 604 to step 606, the method 600 may include detecting an off-route condition during the public transportation segment based on the position information, the off-route condition indicating that the user has deviated from the recommended route during the public transportation segment by a predetermined threshold. This may be accomplished at least in part by updating the user's geographical location data based on a stream of GPS data and accelerometer data received via sensors 24, and comparing the user's geographical location data to the route data retrieved from the public transit server for the city corresponding to the user's geographical location. For example, the mapping application 28 may be configured to calculate a deviation error, which may be a distance the user's location has deviated from the route, a time period that the user's location has deviated from the route, etc. When the calculated deviation error has exceeded the predetermined threshold, the mapping application 28 may set an off-route condition flag to TRUE, and perform the proceeding functions.

In method 600, step 606 may include substeps 608 and 610. Advancing to substep 606, the method 600 may include retrieving route data for a public transit vehicle corresponding to the public transportation segment, the route data including a route of the public transit vehicle. Proceeding from substep 608 to substep 610, the method 600 may include comparing position information for the user to the retrieved route data. In some examples, the public transit servers for a particular city may include updated position information and schedules for each public transit vehicle for that city. If the public transit server stores static public transit schedule and route data, the mapping application 28 may be configured to request the static route data a single time. However, if the public transit server stores updated data including location data and updated route schedules for each public transit vehicle, then the mapping application 28 may be configured to periodically (i.e. every minute) request updated route data from the public transit server. Thus, the mapping application 28 may be configured to compare the user's position information to real time location data for the public transit vehicle corresponding to the public transportation segment.

In one example, the public transportation segment of the recommended route includes a recommended public transit entrance stop for the user to enter the public transit vehicle, and the off-route condition includes a missed public transportation condition indicating that the user did not enter the public transit vehicle at the recommended public transit entrance stop. After the public transportation segment has been selected according to the methods discussed above, the mapping application 28 may select a stop from the corresponding route data that is nearest to the first location 28 as the recommended public transit entrance stop. The recommended public transit entrance stop may be displayed to the user on the display 22, and may include a scheduled time that the corresponding public transit vehicle is scheduled to arrive. In cases where updated position data for the public transit vehicle may be retrieved from the public transit server, the scheduled time displayed for the user may also be updated accordingly. In this example, step 606 further includes steps 612 and 614. Advancing to step 612, the method 600 may include determining that the public transit vehicle has arrived at the recommended public transit entrance stop. This may be accomplished in part by periodically retrieving updated position data for the corresponding public transit vehicle to determine when the public transit vehicle has arrived at a particular stop. Proceeding from step 612 to step 614, the method 600 may include determining that the position information for the user indicates that the user has not followed the route of the public transit vehicle for a predetermined threshold time period. This may be accomplished at least in part by comparing the user's current geographical location to the public transit vehicle's route, which may include, for example, predetermined GPS locations spaced periodically along the route, or position information for each stop along the route. If the user's position information indicates that the user has not followed the route for a predetermined threshold time period after the public transit vehicle arrived at the stop, then the mapping application 28 may be configured to set an off-route condition flag to TRUE.

In another example, the public transportation segment of the recommended route includes a recommended public transit exit stop for the user to exit the public transit vehicle, and the off-route condition includes a missed stop condition indicating that the user did not exit the public transit vehicle at the recommended public transit exit stop. This may be accomplished at least in part by calculating which stop along the route of the public transportation segment is nearest to the second location, and selecting that stop as the recommended public transit exit stop. In this example, step 606 further includes steps 616 and 618. Advancing to step 616, the method 600 may include determining a post exit portion of the route of the public transit vehicle beyond the recommended public transit exit stop. This may be accomplished at least in part by flagging each stop along the route after the recommended public transit exit stop as being included in the post exit portion of the route. Proceeding from step 616 to step 618, the method 600 may include determining that the position information for the user indicates that the user has followed the post exit portion of the route for a predetermined threshold time period. For example, if the user's position information indicates that the user is near the geographical position of a stop that was flagged as a post exit portion stop, then the mapping application 28 may determine that the user is following the post exit portion of the route, and may be configured to set an off-route condition flag as TRUE.

In another example, the off-route condition includes a premature exit condition indicating that the user exited the public transit vehicle before the recommended public transit exit stop. This may be accomplished at least in part by comparing the user's geographical position to the route of the public transit vehicle. If the user's current geographical position deviated from the route by a predetermined threshold, then the off-route condition flag may be set to TRUE. In this example, step 606 further includes steps 620 and 622. Advancing to step 620, the method 600 may include determining a pre exit portion of the route of the public transit vehicle before the recommended public transit stop. This may be accomplished at least in part by flagging each stop along the route before and the recommended public transit exit stop as being included in the pre exit portion of the route. Proceeding from step 620 to step 622, the method 600 may include determining that the position information for the user indicates that the user has not followed the pre exit portion of the route of the public transit vehicle for a predetermined threshold time period. This may be accomplished at least in part by comparing the user's geographical location to the position information for each stop along the route flagged as being included in the pre exit portion of the route and the schedule for the public transit vehicle. For example, if the public transit vehicle is scheduled to arrive at a particular pre exit stop at 11:00 A.M, and at 11:01 A.M. (i.e. predetermined threshold time period is one minute), the user's position information indicates that the user has not arrived at and/or passed that pre exit stop, then the off-route condition flag may be set to TRUE.

Based on at least detecting the off-route condition during the public transportation segment, for example, by evaluating the off-route condition flag and determining that it has a value of TRUE, the method 600 proceeds from step 606 to step 624 and may include programmatically determining a new route to the second location. This may be accomplished at least in part by setting the first location to the user's current location, and recalculating a new recommended route according to the same methods discussed above. Advancing from step 624 to step 626, the method 600 may include displaying the new route to the user. This may be accomplished at least in part by halting display of the recommended route determined previously, and displaying the new route on the display of the mobile computing device 12, It will be appreciated that the method steps described above may be performed using the algorithmic processes described throughout this disclosure, including in the description of the computing system 10 above.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
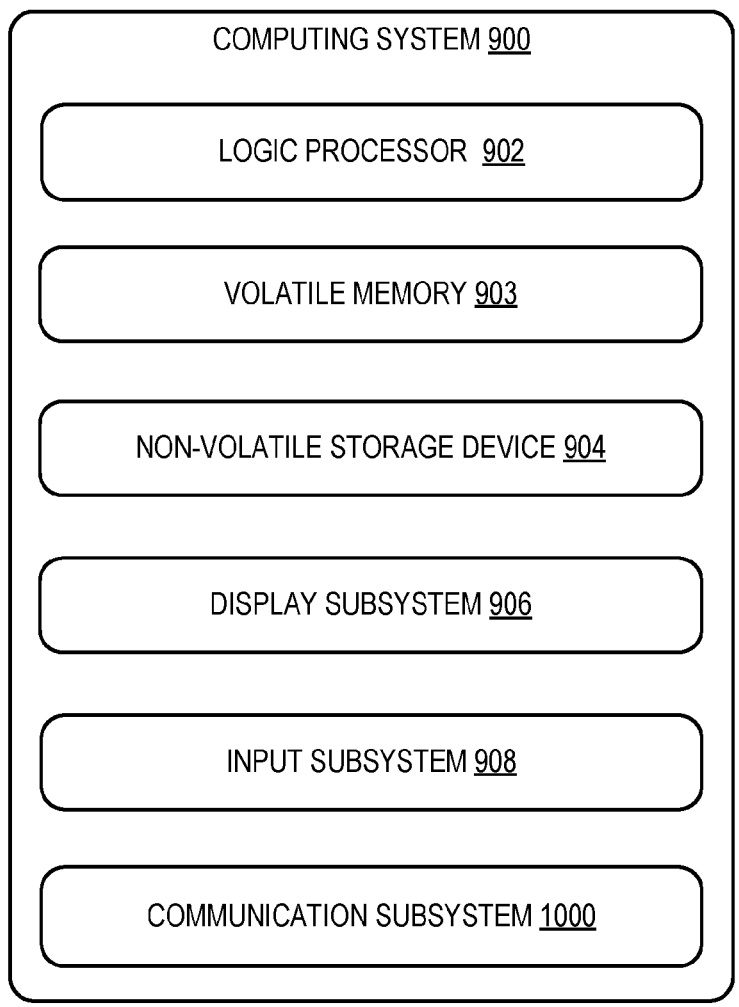
FIG. 11 shows an example computing system according to an embodiment of the present description.

FIG. 11 schematically shows a non-limiting embodiment of a computing system 900 that can enact one or more of the methods and processes described above. Computing system 900 is shown in simplified form. Computing system 900 may embody the mobile computing device 12. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 11.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 94 may be transformed—e.g., to hold different data.

Non-volatile storage device 904 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, microphone, camera, or game controller.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

The following paragraphs provide additional support for the claims of the subject application. One aspect provides a mobile computing device comprising a processor configured to determine a recommended route for a user of the mobile computing device to travel from a first location to a second location, the recommended route including at least a public transportation segment, detect position information for the user of the mobile computing device, detect an off-route condition during the public transportation segment based on the position information, the off-route condition indicating that the user has deviated from the recommended route during the public transportation segment by a predetermined threshold, and based on at least detecting the off-route condition during the public transportation segment, programmatically determine a new route to the second location. In this aspect, additionally or alternatively, to detect an off-route condition during the public transportation segment, the processor may be further configured to retrieve route data for a public transit vehicle corresponding to the public transportation segment, the route data including a route of the public transit vehicle, and compare position information for the user of the mobile computing device to the retrieved route data. In this aspect, additionally or alternatively, the public transportation segment of the recommended route may include a recommended public transit entrance stop for the user to enter the public transit vehicle, and the off-route condition may include a missed public transportation condition indicating that the user did not enter the public transit vehicle at the recommended public transit entrance stop. In this aspect, additionally or alternatively, to detect the missed public transportation condition, the processor may be configured to determine that the public transit vehicle has arrived at the recommended public transit entrance stop based on the route data, and determine that the position information for the user indicates that the user has not followed the route of the public transit vehicle for a predetermined threshold time period. In this aspect, additionally or alternatively, the public transportation segment of the recommended route may include a recommended public transit exit stop for the user to exit the public transit vehicle, and the off-route condition may include a missed stop condition indicating that the user did not exit the public transit vehicle at the recommended public transit exit stop. In this aspect, additionally or alternatively, to detect the missed stop condition, the processor may be configured to determine a post exit portion of the route of the public transit vehicle beyond the recommended public transit exit stop, and determine that the position information for the user indicates that the user has followed the post exit portion of the route for a predetermined threshold time period. In this aspect, additionally or alternatively, the off-route condition may include a premature exit condition indicating that the user exited the public transit vehicle before the recommended public transit exit stop. In this aspect, additionally or alternatively, to detect the premature exit condition, the processor may be configured to determine a pre exit portion of the route of the public transit vehicle before the recommended public transit stop, and determine that the position information for the user indicates that the user has not followed the pre exit portion of the route of the public transit vehicle for a predetermined threshold time period. In this aspect, additionally or alternatively, a route of a public transit vehicle for the public transportation segment may be selected based on user difficulty metric data for that route of the public transit vehicle, and based on at least detecting the off-route condition during the public transportation segment, the processor may be further configured to modify user difficulty metric data for the route of the public transportation segment based on the detected off-route condition, such that the route of the public transit vehicle is less likely to be selected.

Another aspect provides a method comprising determining a recommended route for a user to travel from a first location to a second location, the recommended route including at least a public transportation segment, detecting position information for the user, detecting an off-route condition during the public transportation segment based on the position information, the off-route condition indicating that the user has deviated from the recommended route during the public transportation segment by a predetermined threshold, and based on at least detecting the off-route condition during the public transportation segment, programmatically determining a new route to the second location. In this aspect, additionally or alternatively, detecting an off-route condition during the public transportation segment may further comprise retrieving route data for a public transit vehicle corresponding to the public transportation segment, the route data including a route of the public transit vehicle, and comparing position information for the user to the retrieved route data. In this aspect, additionally or alternatively, the public transportation segment of the recommended route may include a recommended public transit entrance stop for the user to enter the public transit vehicle, and the off-route condition may include a missed public transportation condition indicating that the user did not enter the public transit vehicle at the recommended public transit entrance stop. In this aspect, additionally or alternatively, detecting the missed public transportation condition may further comprises determining that the public transit vehicle has arrived at the recommended public transit entrance stop, and determining that the position information for the user indicates that the user has not followed the route of the public transit vehicle for a predetermined threshold time period. In this aspect, additionally or alternatively, the public transportation segment of the recommended route may include a recommended public transit exit stop for the user to exit the public transit vehicle, and the off-route condition may include a missed stop condition indicating that the user did not exit the public transit vehicle at the recommended public transit exit stop. In this aspect, additionally or alternatively, detecting the missed stop condition may further comprise determining a post exit portion of the route of the public transit vehicle beyond the recommended public transit exit stop, and determining that the position information for the user indicates that the user has followed the post exit portion of the route for a predetermined threshold time period. In this aspect, additionally or alternatively, the off-route condition may include a premature exit condition indicating that the user exited the public transit vehicle before the recommended public transit exit stop. In this aspect, additionally or alternatively, detecting the premature exit condition may further comprise determining a pre exit portion of the route of the public transit vehicle before the recommended public transit stop, and determining that the position information for the user indicates that the user has not followed the pre exit portion of the route of the public transit vehicle for a predetermined threshold time period. In this aspect, additionally or alternatively, a route of a public transit vehicle for the public transportation segment is selected based on user difficulty metric data for that route of the public transit vehicle, and based on at least detecting the off-route condition during the public transportation segment, the method may further include modifying user difficulty metric data for the route of the public transportation segment based on the detected off-route condition, such that the route of the public transit vehicle is less likely to be selected.

Another aspect provides a mobile computing device comprising a processor configured to determine a recommended route for a user of the mobile computing device to travel from a first location to a second location, the recommended route including at least a public transportation segment, detect position information for the user of the mobile computing device, detect an off-route condition during the public transportation segment based on the position information, the off-route condition indicating that the user has deviated from the recommended route during the public transportation segment by a predetermined threshold, and based on at least detecting the off-route condition during the public transportation segment, present the user with an off-route notification indicating that the user has deviated from the recommended route. In this aspect, additionally or alternatively, the off-route notification may include a reroute input, and the processor may be further configured to receive the reroute input from the user of the mobile computing device, and programmatically determine a new route to the second location.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A mobile computing device comprising:
a processor configured to:
  determine a recommended route for a user of the mobile computing device to travel from a first location to a second location, the recommended route including at least a public transportation segment;
  detect position information for the user of the mobile computing device;
  retrieve route data for a public transit vehicle corresponding to the public transportation segment, the route data including a route of the public transit vehicle;
  detect an off-route condition during the public transportation segment based on comparing the position information for the user of the mobile computing device to the retrieved route data, the off-route condition indicating that the user has deviated from the recommended route during the public transportation segment by a predetermined threshold; and
  based on at least detecting the off-route condition during the public transportation segment, programmatically determine a new route to the second location, wherein the public transportation segment of the recommended route includes a recommended public transit entrance stop for the user to enter the public transit vehicle, and the off-route condition includes a missed public transportation condition indicating that the user did not enter the public transit vehicle at the recommended public transit entrance stop.

2. The mobile computing device of claim 1, wherein to detect the missed public transportation condition, the processor is configured to:
  determine that the public transit vehicle has arrived at the recommended public transit entrance stop based on the route data; and
  determine that the position information for the user indicates that the user has not followed the route of the public transit vehicle for a predetermined threshold time period.

3. The mobile computing device of claim 1, wherein the public transportation segment of the recommended route further includes a recommended public transit exit stop for the user to exit the public transit vehicle, and the off-route condition further includes a missed stop condition indicating that the user did not exit the public transit vehicle at the recommended public transit exit stop.

4. The mobile computing device of claim 3, wherein to detect the missed stop condition, the processor is configured to:
  determine a post exit portion of the route of the public transit vehicle beyond the recommended public transit exit stop; and
  determine that the position information for the user indicates that the user has followed the post exit portion of the route for a predetermined threshold time period.

5. The mobile computing device of claim 3, wherein the off-route condition further includes a premature exit condition indicating that the user exited the public transit vehicle before the recommended public transit exit stop.

6. The mobile computing device of claim 5, wherein to detect the premature exit condition, the processor is configured to:
  determine a pre exit portion of the route of the public transit vehicle before the recommended public transit stop; and
  determine that the position information for the user indicates that the user has not followed the pre exit portion of the route of the public transit vehicle for a predetermined threshold time period.

7. A mobile computing device comprising:
a processor configured to:
  determine a recommended route for a user of the mobile computing device to travel from a first location to a second location, the recommended route including at least a public transportation segment;
  detect position information for the user of the mobile computing device;
  detect an off-route condition during the public transportation segment based on the position information, the off-route condition indicating that the user has deviated from the recommended route during the public transportation segment by a predetermined threshold; and
  based on at least detecting the off-route condition during the public transportation segment, programmatically determine a new route to the second location; wherein a route of a public transit vehicle for the public transportation segment is selected based on user difficulty metric data for that route of the public transit vehicle; and
based on at least detecting the off-route condition during the public transportation segment, the processor is further configured to modify the user difficulty metric data for the route of the public transportation segment based on the detected off-route condition, such that the route of the public transit vehicle is less likely to be selected.

8. A method comprising:
determining a recommended route for a user to travel from a first location to a second location via a processor of a mobile computing device, the recommended route including at least a public transportation segment;
detecting position information for the user via sensors of the mobile computing device;
retrieving route data for a public transit vehicle corresponding to the public transportation segment, the route data including a route of the public transit vehicle;
detecting an off-route condition during the public transportation segment based on comparing the position information detected via the sensors of the mobile computing device to the retrieved route data, the off-route condition indicating that the user has deviated from the recommended route during the public transportation segment by a predetermined threshold; and
based on at least detecting the off-route condition during the public transportation segment, programmatically determining a new route to the second location via the processor of the mobile computing device, wherein the public transportation segment of the recommended route includes a recommended public transit entrance stop for the user to enter the public transit vehicle, and the off-route condition includes a missed public transportation condition indicating that the user did not enter the public transit vehicle at the recommended public transit entrance stop.

9. The method of claim 8, wherein detecting the missed public transportation condition further comprises:
determining that the public transit vehicle has arrived at the recommended public transit entrance stop; and
determining that the position information for the user indicates that the user has not followed the route of the public transit vehicle for a predetermined threshold time period.

10. The method of claim 8, wherein the public transportation segment of the recommended route further includes a recommended public transit exit stop for the user to exit the public transit vehicle, and the off-route condition further includes a missed stop condition indicating that the user did not exit the public transit vehicle at the recommended public transit exit stop.

11. The method of claim 10, wherein detecting the missed stop condition further comprises:
determining a post exit portion of the route of the public transit vehicle beyond the recommended public transit exit stop; and
determining that the position information for the user indicates that the user has followed the post exit portion of the route for a predetermined threshold time period.

12. The method of claim 10, wherein the off-route condition further includes a premature exit condition indicating that the user exited the public transit vehicle before the recommended public transit exit stop.

13. The method of claim 12, wherein detecting the premature exit condition further comprises:
determining a pre exit portion of the route of the public transit vehicle before the recommended public transit stop; and
determining that the position information for the user indicates that the user has not followed the pre exit portion of the route of the public transit vehicle for a predetermined threshold time period.

14. A method comprising:
determining a recommended route for a user to travel from a first location to a second location, the recommended route including at least a public transportation segment;
detecting position information for the user;
detecting an off-route condition during the public transportation segment based on the position information, the off-route condition indicating that the user has deviated from the recommended route during the public transportation segment by a predetermined threshold; and
based on at least detecting the off-route condition during the public transportation segment, programmatically determining a new route to the second location; wherein a route of a public transit vehicle for the public transportation segment is selected based on user difficulty metric data for that route of the public transit vehicle; and
based on at least detecting the off-route condition during the public transportation segment, the method further includes modifying the user difficulty metric data for the route of the public transportation segment based on the detected off-route condition, such that the route of the public transit vehicle is less likely to be selected.

15. A mobile computing device comprising:
a processor configured to:
determine a recommended route for a user of the mobile computing device to travel from a first location to a second location, the recommended route including at least a public transportation segment;
detect position information for the user of the mobile computing device; retrieve route data for a public transit vehicle corresponding to the public transportation segment, the route data including a route of the public transit vehicle;
detect an off-route condition during the public transportation segment based on comparing the position information for the user of the mobile computing device to the retrieved route data, the off-route condition indicating that the user has deviated from the recommended route during the public transportation segment by a predetermined threshold; and
based on at least detecting the off-route condition during the public transportation segment, present the user with an off-route notification indicating that the user has deviated from the recommended route, wherein the public transportation segment of the recommended route includes a recommended public transit entrance stop for the user to enter the public transit vehicle, and the off-route condition includes a missed public transportation condition indicating that the user did not enter the public transit vehicle at the recommended public transit entrance stop.

16. The mobile computing device of claim 15, wherein the off-route notification includes a reroute input, and the processor is further configured to:

receive the reroute input from the user of the mobile computing device; and programmatically determine a new route to the second location.

* * * * *